(12) United States Patent
Zhang

(10) Patent No.: US 11,086,833 B2
(45) Date of Patent: Aug. 10, 2021

(54) DATA STORAGE METHOD AND APPARATUS FOR DISTRIBUTED DATABASE

(71) Applicant: Huawei Technologies Co., Ltd., Shenzhen (CN)

(72) Inventor: Jun Zhang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1579 days.

(21) Appl. No.: 15/043,853

(22) Filed: Feb. 15, 2016

(65) Prior Publication Data

US 2016/0162520 A1 Jun. 9, 2016

Related U.S. Application Data

(63) Continuation of application No. PCT/CN2014/081346, filed on Jul. 1, 2014.

(30) Foreign Application Priority Data

Aug. 16, 2013 (CN) .......................... 201310360240.8

(51) Int. Cl.
*G06F 16/22* (2019.01)
*G06F 16/245* (2019.01)
(Continued)

(52) U.S. Cl.
CPC .......... *G06F 16/22* (2019.01); *G06F 16/2379* (2019.01); *G06F 16/245* (2019.01); *G06F 16/2471* (2019.01); *G06F 16/27* (2019.01)

(58) Field of Classification Search
CPC .................... G06F 17/00; G06F 16/84
(Continued)

(56) References Cited

U.S. PATENT DOCUMENTS 5,499,371 A * 3/1996 Henninger ................ G06F 8/24
717/108
6,092,061 A 7/2000 Choy
(Continued)

FOREIGN PATENT DOCUMENTS

CN 1949226 A 4/2007
CN 101854398 A 10/2010
(Continued)

OTHER PUBLICATIONS

Machine Translation and Abstract of Chinese Publication No. CN101854398, Oct. 6, 2010, 14 pages.
(Continued)

*Primary Examiner* — Baoquoc N To
(74) *Attorney, Agent, or Firm* — Conley Rose, P.C.

(57) ABSTRACT

A data storage method and apparatus for a distributed database which includes receiving, by a first node, a record insertion request, where the record insertion request carries a first record, and determining, by the first node according to a mapping relationship between a foreign key identifier and a storage node, a first storage node on which a first associated record that corresponds to the first record is located, where a primary key identifier of the first associated record is same as a foreign key identifier of the first record, and inserting, by the first node, the first record to a second node in the first storage nodes.

20 Claims, 7 Drawing Sheets

(51) Int. Cl.
*G06F 16/23* (2019.01)
*G06F 16/27* (2019.01)
*G06F 16/2458* (2019.01)

(58) Field of Classification Search
USPC .......................... 707/610, 667, 999.204, 706
See application file for complete search history.

(56) References Cited

U.S. PATENT DOCUMENTS

| | | | |
|---|---|---|---|
| 6,598,042 B1* | 7/2003 | Kienan | G06F 16/3322 |
| 7,562,102 B1* | 7/2009 | Sumner | G06F 16/27 |
| 8,676,863 B1* | 3/2014 | Connell | G06F 16/284 |
| | | | 707/804 |
| 2002/0091677 A1* | 7/2002 | Sridhar | G06F 16/972 |
| 2003/0188555 A1* | 10/2003 | Henning | G02B 6/2835 |
| | | | 65/381 |
| 2005/0138160 A1* | 6/2005 | Klein | H04L 41/024 |
| | | | 709/223 |
| 2006/0026168 A1* | 2/2006 | Bosworth | H04L 67/1095 |
| 2008/0034014 A1* | 2/2008 | Beck | G06F 16/27 |
| 2009/0210631 A1* | 8/2009 | Bosworth | G06F 12/0875 |
| | | | 711/141 |
| 2009/0259618 A1* | 10/2009 | Shi | G06F 16/24565 |
| 2011/0035368 A1* | 2/2011 | Cole | G06F 16/24544 |
| | | | 707/714 |
| 2011/0170466 A1* | 7/2011 | Kwun | H04W 52/0206 |
| | | | 370/311 |
| 2012/0030245 A1* | 2/2012 | Hermstadt | G06F 16/221 |
| | | | 707/798 |
| 2012/0109888 A1* | 5/2012 | Zhang | G06F 16/278 |
| | | | 707/610 |
| 2012/0215746 A1 | 8/2012 | Auchmoody et al. | |
| 2012/0303791 A1 | 11/2012 | Calder et al. | |
| 2013/0007008 A1 | 1/2013 | Yuan et al. | |
| 2013/0159265 A1 | 6/2013 | Peh et al. | |
| 2014/0172788 A1* | 6/2014 | Haase | G06F 16/27 |
| | | | 707/610 |

FOREIGN PATENT DOCUMENTS

| | | |
|---|---|---|
| CN | 101916261 A | 12/2010 |
| CN | 102197372 A | 9/2011 |
| CN | 102402394 A | 4/2012 |
| CN | 102521374 A | 6/2012 |
| CN | 102710465 A | 10/2012 |

OTHER PUBLICATIONS

Machine Translation and Abstract of Chinese Publication No. CN102710465, Oct. 3, 2012, 7 pages.
Wu, H., et al., "Consistency Update for Workflow Relevant Data in Distributed Store Environment," Journal of System Simulation, vol. 21, No. 8, Apr. 2009, 6 pages.
Liu J., "Hybrid Data Placement Algorithm in Distributed Storage System," Journal of Jiangsu Teachers University of Technology, vol. 4, No. 17, Apr. 2011, 8 pages.
English Abstract of Liu J., "Hybrid Data Placement Algorithm in Distributed Storage System," Journal of Jiangsu Teachers University of Technology, vol. 4, No. 17, Apr. 2011, 1 page.
Foreign Communication From a Counterpart Application, Chinese Application No. 201310360240.8, Chinese Office Action dated May 3, 2017, 5 pages.
Foreign Communication From A Counterpart Application, PCT Application No. PCT/CN2014/081346, English Translation of International Search Report dated Nov. 26, 2014, 2 pages.
Foreign Communication From A Counterpart Application, PCT Application No. PCT/CN2014/081346, English Translation of Written Opinion dated Nov. 26, 2014, 11 pages.

* cited by examiner

DATA STORAGE METHOD AND APPARATUS FOR DISTRIBUTED DATABASE

CROSS-REFERENCE TO RELATED APPLICATION

This application is a continuation of International Application No. PCT/CN2014/081346, filed on Jul. 1, 2014, which claims priority to Chinese Patent Application No. 201310360240.8, filed on Aug. 16, 2013, both of which are hereby incorporated by reference in their entireties.

TECHNICAL FIELD

Embodiments of the present disclosure relate to the field of information technologies, and in particular, to a data storage method and apparatus for a distributed database.

BACKGROUND

In distributed data storage, a front-end server performs partitioning or sharding on data in each data table according to a rule, and then, distributively stores the data on multiple different nodes. Herein, the data may be multiple records in the data table, and a database instance that runs on each node manages a record allocated to the node. In order to ensure reliability of a system, in a distributed system, usually, at least one copy is stored on another node for each piece of data, that is, after a master node receives data, the data is backed up on one or more nodes (slave nodes). Because used partitioning and backup methods are independently applied to each data table, for a relatively complex query associated with multiple data tables, if the associated data tables are not on a same node, a cross-node associated query needs to be performed, thereby affecting a query response time and query efficiency.

To resolve disadvantages of the foregoing cross-node query, in the prior art, on the front-end server, records in a dimension table are distributively stored on nodes, and if a record in a fact table that is associated with the dimension table needs to be inserted to some nodes, the records in the associated dimension table on a node on which the fact table is stored need to be copied to a node to which the record needs to be inserted, so that associated records in the dimension table and in the fact table can be saved on a same node.

However, in the prior art, because related data needs to be copied across nodes in a record insertion process, low data insertion efficiency and a low data update speed are caused.

SUMMARY

Embodiments of the present disclosure provide a data storage method and apparatus for a distributed database, so as to resolve a technical problem of low data insertion efficiency and a low data update speed in the prior art.

A first aspect of the embodiments of the present disclosure provides a data storage method for a distributed database, including receiving, by a first node, a record insertion request, where the record insertion request carries a first record, determining, by the first node according to a mapping relationship between a foreign key identifier and a storage node, a first storage node on which a first associated record that corresponds to the first record is located, where a primary key identifier of the first associated record is the same as a foreign key identifier of the first record, and inserting, by the first node, the first record to a second node in the first storage nodes.

With reference to the first aspect, in a first possible implementation manner of the first aspect, the determining, by the first node according to a mapping relationship between a foreign key identifier and a storage node, a first storage node on which a first associated record that corresponds to the first record is located includes querying, by the first node, the mapping relationship between a foreign key identifier and a storage node according to the foreign key identifier of the first record, to determine the first storage node on which the first associated record that corresponds to the first record is located.

With reference to the first aspect, in a second possible implementation manner of the first aspect, after the inserting, by the first node, the first record to a second node in the first storage nodes, the method further includes inserting, by the first node, the first record to a third node, where the third node is a node in the first storage nodes except the second node.

With reference to the first aspect or the second possible implementation manner of the first aspect, in a third possible implementation manner of the first aspect, the first storage nodes include a master storage node and a backup storage node that store the first associated record.

With reference to the second possible implementation manner of the first aspect, in a fourth possible implementation manner of the first aspect, after the inserting, by the first node, the first record to a second node in the first storage nodes, the method further includes, if the first node receives, within a preset time, a response message that is returned by either node of the second node and the third node and indicates that the first record is successfully inserted, inserting, by the first node, the first record to the first node.

With reference to the fourth possible implementation manner of the first aspect, in a fifth possible implementation manner of the first aspect, after the inserting, by the first node, the first record to the first node, the method further includes receiving, by the first node, an update command, where the update command carries a second record, querying, by the first node, the mapping relationship between a foreign key identifier and a storage node according to a foreign key identifier of the second record, to determine a second storage node on which a second associated record that corresponds to the second record is located, where a primary key identifier of the second associated record is the same as the foreign key identifier of the second record, and determining, by the first node, a fourth node from the second storage nodes.

With reference to the fifth possible implementation manner of the first aspect, in a sixth possible implementation manner of the first aspect, after the determining, by the first node, a fourth node, the method further includes, if the foreign key identifier of the second record is different from the foreign key identifier of the first record, determining, by the first node, whether the fourth node and the second node are a same node, and if the fourth node and the second node are a same node, inserting, by the first node, the second record to the first node, the third node, and the second node, or if the fourth node and the second node are not a same node, deleting, by the first node, the first record from the second node, and inserting the second record to the fourth node to which the second record belongs, or if the foreign key identifier of the second record is the same as the foreign key identifier of the first record, inserting, by the first node, the second record to the first node, the third node, and the second node.

With reference to the fourth possible implementation manner of the first aspect, in a seventh possible implementation manner of the first aspect, after the inserting, by the first node, the first record to the first node, the method further includes receiving, by the first node, a command of deleting a third record, where the command carries a foreign key identifier of the third record, querying, by the first node, the mapping relationship between a foreign key identifier and a storage node according to the foreign key identifier of the third record, to determine a third storage node on which a third associated record that corresponds to the third record is located, where a primary key identifier of the third associated record is the same as a foreign key identifier of the third record, determining, by the first node, from the third storage nodes, a fifth node that stores the third record; and sending, by the first node, the command to the fifth node, so that the fifth node deletes the third record stored on the fifth node.

With reference to the fourth possible implementation manner of the first aspect, in an eighth possible implementation manner of the first aspect, after the inserting, by the first node, the first record to the first node, the method further includes, if the first node is offline, sending, by the third node, primary key identifiers of all records on the third node to another node in the distributed database except the third node, so that the other node queries, according to the primary key identifiers of all the records, records that correspond to the primary key identifiers of all the records, and receiving, by the third node, the records that correspond to the primary key identifiers of all the records and are sent by the other node, and inserting the records that correspond to the primary key identifiers of all the records to the third node.

With reference to the fourth possible implementation manner of the first aspect, in a ninth possible implementation manner of the first aspect, after the inserting, by the first node, the first record to the first node, the method further includes, determining, by the first node, load capacity of another node in the distributed database except the second node and the third node; sending, by the first node, a record stored on the first node to a sixth node, where load capacity of the sixth node is lower than load capacity of the first node; and deleting, by the first node, the record stored on the first node and sent to the sixth node.

A second aspect of the embodiments of the present disclosure provides a data storage apparatus for a distributed database, including a first receiving module configured to receive a record insertion request, where the record insertion request carries a first record, a first determining module configured to determine, according to a mapping relationship between a foreign key identifier and a storage node, a first storage node on which a first associated record that corresponds to the first record is located, where a primary key identifier of the first associated record is the same as a foreign key identifier of the first record; and a first insertion module configured to insert the first record to a second node in the first storage nodes.

With reference to the second aspect, in a first possible implementation manner of the second aspect, the first determining module is further configured to query the mapping relationship between a foreign key identifier and a storage node according to the foreign key identifier of the first record, to determine the first storage node on which the first associated record that corresponds to the first record is located.

With reference to the second aspect, in a second possible implementation manner of the second aspect, the first insertion module is further configured to, after inserting the first record to the second node in the first storage nodes, insert the first record to a third node, where the third node is a node in the first storage nodes except the second node.

With reference to the second aspect or the second possible implementation manner of the second aspect, in a third possible implementation manner of the second aspect, the first storage nodes include a master storage node and a backup storage node that store the first associated record.

With reference to the second possible implementation manner of the second aspect, in a fourth possible implementation manner of the second aspect, the apparatus further includes a second insertion module configured to, after the first insertion module inserts the first record to the second node in the first storage nodes, if a first insertion success response message returned by either node of the second node and the third node is received within a preset time, insert the first record to a first node of the data storage apparatus for a distributed database.

With reference to the fourth possible implementation manner of the second aspect, in a fifth possible implementation manner of the second aspect, the apparatus further includes a second receiving module configured to, after the second insertion module inserts the first record to the first node of the data storage apparatus for a distributed database, receive an update command, where the update command carries a second record, where the first determining module is further configured to query the mapping relationship, between a foreign key identifier and a storage node, on the first node according to a foreign key identifier of the second record, to determine a second storage node on which a second associated record that corresponds to the second record is located, where a primary key identifier of the second associated record is the same as the foreign key identifier of the second record, and a second determining module configured to determine a fourth node from the second storage nodes.

With reference to the fifth possible implementation manner of the second aspect, in a sixth possible implementation manner of the second aspect, the apparatus further includes a judging module configured to, after the second determining module determines the fourth node, if the foreign key identifier of the second record is different from the foreign key identifier of the first record, determine whether the fourth node and the second node are a same node, where if the fourth node and the second node are a same node, the second insertion module inserts the second record to the first node of the data storage apparatus for a distributed database, the third node, and the second node, or if the fourth node and the second node are not a same node, the second insertion module deletes the first record from the second node, and inserts the second record to the fourth node to which the second record belongs, or if the foreign key identifier of the second record is the same as the foreign key identifier of the first record, the second insertion module inserts the second record to the first node of the data storage apparatus for a distributed database, the third node, and the second node.

With reference to the fourth possible implementation manner of the second aspect, in a seventh possible implementation manner of the second aspect, the apparatus further includes a third receiving module configured to, after the second insertion module inserts the first record to the first node of the data storage apparatus for a distributed database, receive a command of deleting a third record, where the command carries a foreign key identifier of the third record;

a third determining module configured to query the mapping relationship between a foreign key identifier and a storage node according to the foreign key identifier of the third record, to determine a third storage node on which a third associated record that corresponds to the third record is located, where a primary key identifier of the third associated record is the same as a foreign key identifier of the third record, and further configured to determine, from the third storage nodes, a fifth node that stores the third record, and a first sending module configured to send the command to the fifth node, so that the fifth node deletes the third record stored on the fifth node.

With reference to the fourth possible implementation manner of the second aspect, in an eighth possible implementation manner of the second aspect, the apparatus further includes a second sending module configured to, after the second insertion module inserts the first record to the first node of the data storage apparatus for a distributed database, if the first node of the data storage apparatus for a distributed database is offline, send, by the second sending module, primary key identifiers of all records on the third node to another node in the distributed database except the third node, so that the other node queries, according to the primary key identifiers of all the records, records that correspond to the primary key identifiers of all the records, and a fourth receiving module configured to receive the records that correspond to the primary key identifiers of all the records and are sent by the other node, and insert the records that correspond to the primary key identifiers of all the records to the third node.

With reference to the fourth possible implementation manner of the second aspect, in a ninth possible implementation manner of the second aspect, the apparatus further includes a fourth determining module configured to, after the second insertion module inserts the first record to the first node of the data storage apparatus for a distributed database, determine load capacity of another node in the distributed database except the second node and the third node, a third sending module configured to send a record stored on the first node to a sixth node, where load capacity of the sixth node is lower than load capacity of the first node, and a deletion module configured to delete the record stored on the first node of the data storage apparatus for a distributed database and sent to the sixth node.

According to the method provided in the embodiments of the present disclosure, a first node receives a first record in a record insertion request, and determines, according to a mapping relationship, between a foreign key identifier and a storage node, on the first node, a first storage node on which a first associated record that corresponds to the first record is located, so as to insert the first record to any second node in the first storage nodes, thereby improving data insertion efficiency and a data update speed.

BRIEF DESCRIPTION OF DRAWINGS

To describe the technical solutions in the embodiments of the present disclosure more clearly, the following briefly introduces the accompanying drawings required for describing the embodiments.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure.

Figure 1:
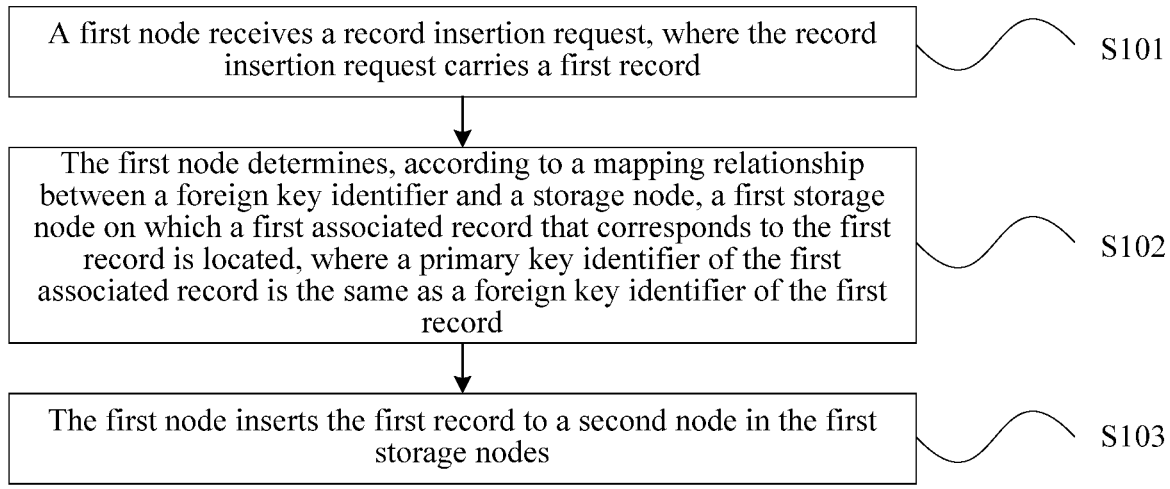
FIG. 1 is a schematic flowchart of Embodiment 1 of a data storage method for a distributed database according to the present disclosure.

FIG. 1 is a schematic flowchart of Embodiment 1 of a data storage method for a distributed database according to the present disclosure. As shown in FIG. 1, the method includes:

Step S101: A first node receives a record insertion request, where the record insertion request carries a first record.

A distributed database system in this embodiment of the present disclosure includes at least one node and a client. The first node may be any node in the distributed database system.

After determining that a record needs to be inserted, the client delivers a record insertion request to a front-end server, and the front-end server may send the record insertion request to any node in the distributed database system.

Different data tables have different primary keys, for example, a primary key of a student information table may be a student number, and a primary key of a transcript may be a score sequence number. Records in the different data tables may be partitioned using primary key identifiers (where a primary key identifier may uniquely represent a record in a data table, and usually, a value of a primary key cannot be missing, that is, the primary key is not set to null). It should be noted that, usually, the primary key identifier may be identified using a number, a letter, or the like. For example, consecutive natural numbers such as 1, 2, 3, 4, . . . , may be used to represent different primary key identifiers. Therefore, usually, the front-end server may distributively store, on different nodes, the records in the data table according to a value range of the primary key identifiers. For example, records with primary key identifiers 1 to 10 may be stored in one node, and records with primary key identifiers 11 to 20 may be stored in one node, and so on.

Two data tables are used as an example herein, and are a student information table and a transcript, where the student information table includes a student number, a name, and address information of a student, and the transcript includes a score sequence number, a student number of a student, a student name, a subject, and a score. A primary key of the student information table is a student number of a student, and a primary key of the transcript is a score sequence number, and a foreign key is a student number of a student. Herein, the student information table and the transcript are two associated tables that are associated using the foreign key of the transcript and the primary key of the student information table. Furthermore, if a foreign key identifier (a student number of a student) of a record in the transcript is the same as a primary key identifier (a student number of a student) of a record in the student information table, the record in the transcript is associated with the record in the student information table.

The student information table is a dimension table involved in this embodiment of the present disclosure, which only has a primary key identifier, and the transcript is a fact table involved in this embodiment of the present disclosure, which not only has a primary key identifier but also has a foreign key identifier, where the foreign key identifier of the transcript is the primary key identifier of the student information table. The front-end server distributively stores, on nodes, records in the student information table according to a primary key identifier (a student number of a student) of each record in the student information table, and similarly, distributes multiple records in the transcript to nodes in the distributed database system according to a primary key identifier (a score sequence number) of each record in the transcript. It is assumed herein that there are 5 nodes in the distributed database system, which are a node A, a node B, a node C, a node D, and a node E, the student information table has information records of 10 students with student numbers 001 to 010, and the transcript has 20 score records with score sequence numbers 1 to 20, where each student corresponds to scores of 2 subjects. The front-end server may distribute information records of students with student numbers 001 to 002 to the node A, and back up the information records on the node B and the node C, distribute information records of students with student numbers 003 to 004 to the node B, and back up the information records on the node A and the node C, distribute information records of students with student numbers 005 to 006 to the node C, and back up the information records on the node B and the node A, and by that analogy, respectively distribute information records of students with a range of student numbers 007 to 008 and with a range of student numbers 009 to 010 to the node D and the node E, and also back up the information records on corresponding nodes. Ten score records with a range of score sequence numbers 1 to 10 are further stored on the node A, and are backed up on the node B and the node C. Ten score records with a range of score sequence numbers 11 to 20 are stored on the node C, and are backed up on the node A and the node D. By that analogy, score records with a range of score sequence numbers 21 to 30 may be further stored on the node B, and are backed up on the node D and the node E, and score records with a range of score sequence numbers 31 to 40 and with a range of score sequence numbers 41 to 50 may be also stored on the node D and the node E respectively, and are also backed up on correspond nodes. However, currently, the node B, the node D, and the node E store no score record.

Herein, the first node receives the record insertion request sent by the front-end server, and parses the record insertion request, to acquire the first record carried in the record insertion request. According to the example given in the foregoing, for ease of describing the technical solutions, the first record in this embodiment of the present disclosure may be a physics score record of a student with a score sequence number 22 and a student number 001 and the first node is the node B.

Step S102: The first node determines, according to a mapping relationship between a foreign key identifier and a storage node, a first storage node on which a first associated record that corresponds to the first record is located, where a primary key identifier of the first associated record is the same as a foreign key identifier of the first record.

In an implementation manner, the determining, by the first node according to a mapping relationship between a foreign key identifier and a storage node, a first storage node on which a first associated record that corresponds to the first record is located includes querying, by the first node, the mapping relationship between a foreign key identifier and a storage node according to the foreign key identifier of the first record, to determine the first storage node on which the first associated record that corresponds to the first record is located.

It should be noted that, any node in the system may be the first node involved in this embodiment of the present disclosure, or may be the first storage node. That is, any node in the system may serve as a node on which a record insertion operation is performed, or may serve as a storage node that stores a record.

Furthermore, after acquiring the first record, the first node (the node B) determines whether a foreign key identifier exists in a data table to which the first record is to be inserted, to determine whether the data table to which the first record is to be inserted is a fact table, and if an foreign key identifier exists, determines that the data table to which the first record is to be inserted is a fact table. For example, for the physics score record of the student with the score sequence number 22 and the student number 001 of the student, the score sequence number 22 is a primary key identifier, and the student number 001 of the student is the foreign key identifier. Therefore, the transcript to which the score record is to be inserted is a fact table (a transcript). If a primary key identifier of a record is the same as the foreign key identifier of the first record, the record is an associated record of the first record, and is referred to as the first associated record herein. Further, the first storage node used to store the first associated record may be determined according to the mapping relationship, between a foreign key identifier and a storage node, on the first node, and there are multiple first storage nodes. That is, the foreign key identifier of the first record is the student number 001, while a student information record with the student number 001 is stored on the node A, and is backed up on the node B and the node C. Therefore, the first storage nodes include the node A, the node B, and the node C. The node A may be referred to as a master copy node of the student information table, and the node B and the node C are slave copy nodes of the student information table, where the node A stores a master copy, slave copies are backed up on the node B and the node C, and both the master copy and the slave copy are referred to as a primary key copy of the first associated record.

Step S103: The first node inserts the first record to a second node in the first storage nodes.

After determining the first storage node that is used to store the first associated record associated with the first record, the node B may select any node from the first storage nodes (the node A, the node B, and the node C) as a foreign key copy node, that is, the second node (which is assumed to be the node A herein), and insert the physics score record of the student with the sequence number 22 and the student number 001 to the foreign key copy node (the node A), to generate a foreign key copy. In this way, both the student information record with the student number 001 and the physics score record with the student number 001 are stored on the same node A, and when the client queries related information of the student with the student number 001, a cross-node query can be avoided. On the other hand, assuming that the information record of the student with the student number 001 needs to be updated (to update address information of the student with the student number 001), it needs to update only records on the node A, and on the node B and the node C that back up the student information record with the student number 001 (where a quantity of master copy nodes is constant herein, and is determined by a system parameter), and the student information record with the student number 001 on the node A does not need to be copied on multiple nodes. Therefore, during the update, it needs to update records on all nodes that copy the record of the student with the student number 001. Therefore, the method in this embodiment of the present disclosure also improves a data update speed.

In addition, if it is determined in the foregoing that the data table to which the first record is to be inserted is a dimension table rather than the fact table, processing is performed according to the prior art, that is, a node (the node D and the node E) on which the score record with the sequence number 22 needs to be backed up is determined according to a mapping relationship between the primary key identifier (the sequence number 22) of the first record and a storage node, and the first record is inserted to the node D and the node E. If either node of the node D and the node E returns an insertion success response message to the node B within a time, the node B inserts the first record to the node B, or if the node B receives no insertion success response message returned by either node of the node D and the node E, the node B returns an insertion failure response message to the client, and ends this insertion process.

To better show advantages in data insertion efficiency and a data update speed of this embodiment of the present disclosure, another simple example is used for description.

When a record is inserted, assuming that a customer wants to insert a score record with a subject Chinese, a student number 001, and a score sequence number of 100 to a node 2 using the front-end server (an objective is inserting a score record and a student information record with the student number 001 to a same node), and assuming that there is no student information record with the student number 001 on the current node 2, that is, a position of a student with the student number 001 cannot be found on the node 2 (where a node 1 saves student information with the student number 001), the front-end server needs to copy, from the node 1, the student information with the student number 001 to the node 2 and saves the student information, and then, the front-end server insert the score record in this example to the node 2. A copy process is added in the middle, which causes a system delay. Therefore, insertion efficiency is low. Moreover, during update, assuming that address information of the student with the student number 001 on the node 1 is updated, the student information with the student number 001 that is stored on the node 2 needs to be further updated. While in the present disclosure, when the score record is inserted, the front-end server needs to only determine, according to a foreign key identifier of the score record by querying a mapping relationship, between a foreign key identifier and a storage node, on the node 2, that the student information with the student number 001 is stored on the node 1, and then the front-end server directly inserts the current score record to the node 1, to ensure that the student information record and the score record with the student number 001 node are on a same node, which avoids a cross-node copying process in the prior art, thereby reducing an insertion time, and improving the insertion efficiency. Moreover, during the update, it needs to only update the address information of the student with the student number 001 on the node 1, so that an update speed is improved.

According to the method provided in this embodiment of the present disclosure, a first node receives a first record in a record insertion request, and determines, according to a mapping relationship, between a foreign key identifier and a storage node, on the first node, a first storage node on which a first associated record that corresponds to the first record is located, so as to insert the first record to a second node in the first storage nodes, thereby improving data insertion efficiency and a data update speed.

Figure 2:
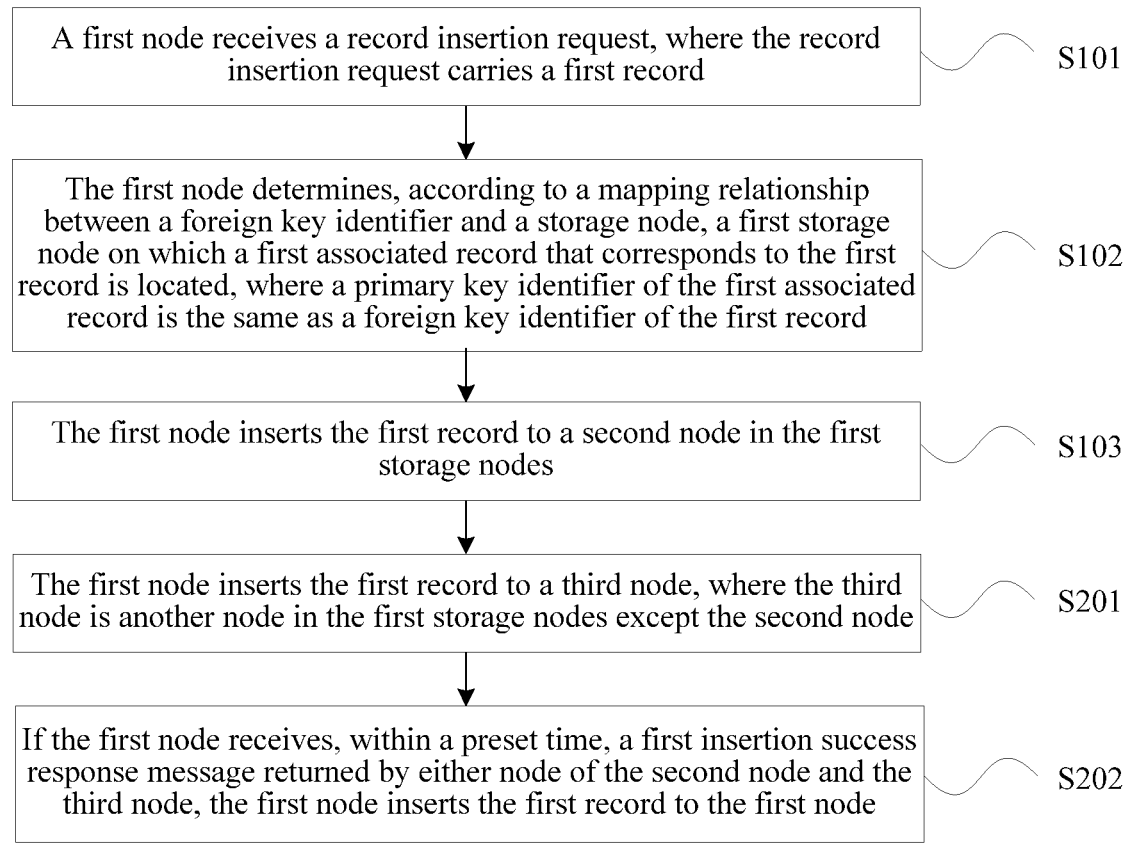
FIG. 2 is a schematic flowchart of Embodiment 2 of a data storage method for a distributed database according to the present disclosure.

FIG. 2 is a schematic flowchart of Embodiment 2 of a data storage method for a distributed database according to the present disclosure. On a basis of the foregoing embodiment shown in FIG. 1, the first storage nodes include a master storage node that stores the first associated record, and a backup storage node that stores the first associated record, and the first node queries the mapping relationship between a foreign key identifier and a storage node and on the first node according to the foreign key identifier of the first record, to determine the first storage node on which the first associated record that corresponds to the first record is located. Further, after step S103, the method further includes:

Step S201: The first node inserts the first record to a third node, where the third node is another node in the first storage nodes except the second node.

Furthermore, after the first node determines the first storage node (that is, the node A, the node B, and the node C in the foregoing example) of the first associated record that is associated with the first record, and inserts the first record to the second node in the first storage nodes in Embodiment 1, the first node further determines to insert the first record to the third node in the first storage nodes except the second node according to the system parameter in the distributed database. It is assumed herein that the third node is the node C, that is, the first record may have another foreign key copy node.

Further, on the basis of the foregoing embodiment shown in FIG. 2, after step S201, the method further includes:

Step S202: If the first node receives, within a preset time, a first insertion success response message returned by either node of the second node and the third node, the first node inserts the first record to the first node.

After the first node inserts the first record to the second node and the third node, the first node determines, within the preset time, whether the first insertion success response message sent by either node of the second node and the third node is received, and if the first insertion success response message is received, the first node inserts the first record to the first node, or if the first insertion success response message is not received, the first node returns an insertion failure response message to the client, and ends this process of inserting the first record. In addition, it should be noted that, if the distributed database system requires relatively high consistency, the first node needs to receive, within the preset time, insertion success response messages returned by the second node and the third node, and then the first node inserts the first record to the first node.

According to the method provided in this embodiment of the present disclosure, a first node receives a first record, and determines, according to a mapping relationship, between a foreign key identifier and a storage node, on the first node, a first storage node on which a first associated record that corresponds to the first record is located, so as to insert the first record to a second node in the first storage nodes, so that the first record and the first associated record can be stored on a same node, which avoids cross-node query for a client, thereby reducing network traffic and a transmission delay brought when a system performs an associated query, reducing a query response time of the system, and also improving data insertion efficiency and a data update speed.

Figure 3:
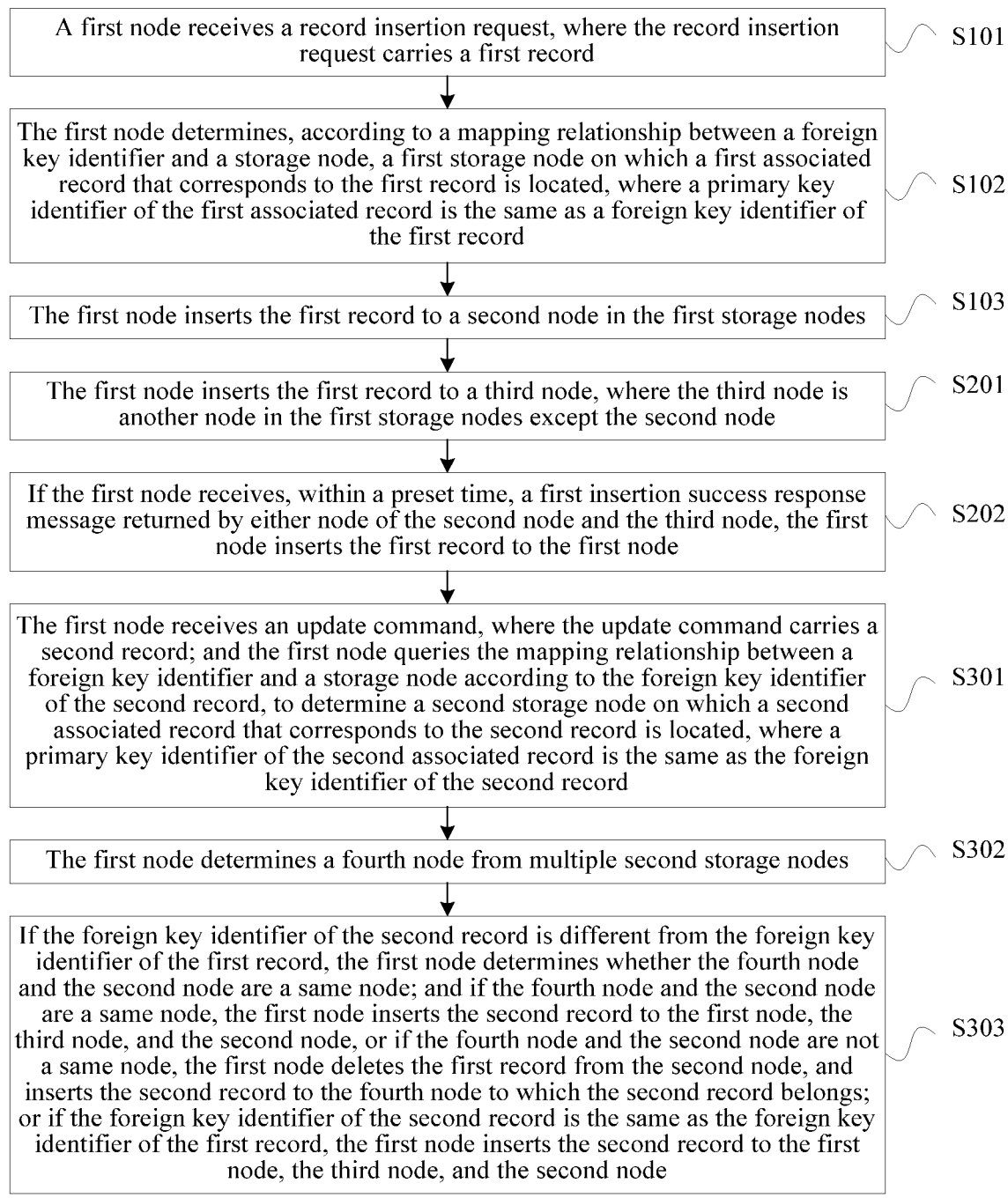
FIG. 3 is a schematic flowchart of Embodiment 3 of a data storage method for a distributed database according to the present disclosure.

FIG. 3 shows a data storage method for a distributed database according to the present disclosure. The method involved in this embodiment is to perform a series of update operations when the first node receives a record update command. On a basis of the foregoing embodiment, after step S202, the method for determining the record on the node, and a foreign key identifier of a second record to be inserted and updated, and performing a corresponding update operation according to a determining result further includes:

Step S301: The first node receives an update command, where the update command carries a second record; and the first node queries the mapping relationship between a foreign key identifier and a storage node according to the foreign key identifier of the second record, to determine a second storage node on which a second associated record that corresponds to the second record is located, where a primary key identifier of the second associated record is the same as the foreign key identifier of the second record.

Step S302: The first node determines a fourth node from the multiple second storage nodes.

Furthermore, the first node receives the update command, where the update command carries the second record. To continue to give an example according to the example in the foregoing embodiment, the second record is also a score record, and the second record and the first record have a same primary key identifier (a same score sequence number); and the first node queries the mapping relationship, between a foreign key identifier and a storage node, on the first node according to the foreign key identifier of the second record, to determine the second storage node of the second associated record that corresponds to the second record, where there are multiple second storage nodes, and selects the fourth node from the second storage nodes, that is, the fourth node is a foreign key copy node of the second record.

Step S303: If the foreign key identifier of the second record is different from the foreign key identifier of the first record, the first node determines whether the fourth node and the second node are a same node; and if the fourth node and the second node are a same node, the first node inserts the second record to the first node, the third node, and the second node, or if the fourth node and the second node are not a same node, the first node deletes the first record from the second node, and inserts the second record to the fourth node to which the second record belongs; or if the foreign key identifier of the second record is the same as the foreign key identifier of the first record, the first node inserts the second record to the first node, the third node, and the second node.

Furthermore, there are two cases for determining, by the first node, whether the foreign key identifier of the second record is the same as the foreign key identifier of the first record, that is, determining whether a student number of a student in the second record is the same as the student number of the student in the first record.

Case 1: If the foreign key identifier of the second record is different from the foreign key identifier of the first record, the first node determines whether the fourth node to which the second record belongs and the second node to which the first record belongs are a same node, and if the fourth node and the second node are a same node, the first node inserts the second record to the first node, the third node, and the second node, that is, the second record is inserted to the first node (equivalent to a local node) and two foreign key copy nodes, or if the fourth node and the second node are not a same node, the first node deletes the first record from the second node, and inserts the second record to the fourth node to which the second record belongs. The first record on an original foreign key copy node needs to be deleted because one sequence number can correspond to only one score record.

Case 2: If the foreign key identifier of the second record is the same as the foreign key identifier of the first record, the second record is inserted to the first node, the third node, and the second node.

According to the method provided in this embodiment of the present disclosure, a first node receives an update command, determines, according to a foreign key identifier of a second record that is carried in the update command, a fourth node that stores the second record, that is, a foreign key copy node of the second record, and performs a corresponding update operation by determining whether the fourth node and the second node are a same node, thereby improving a speed of updating data by a system after the data is inserted.

Figure 4:
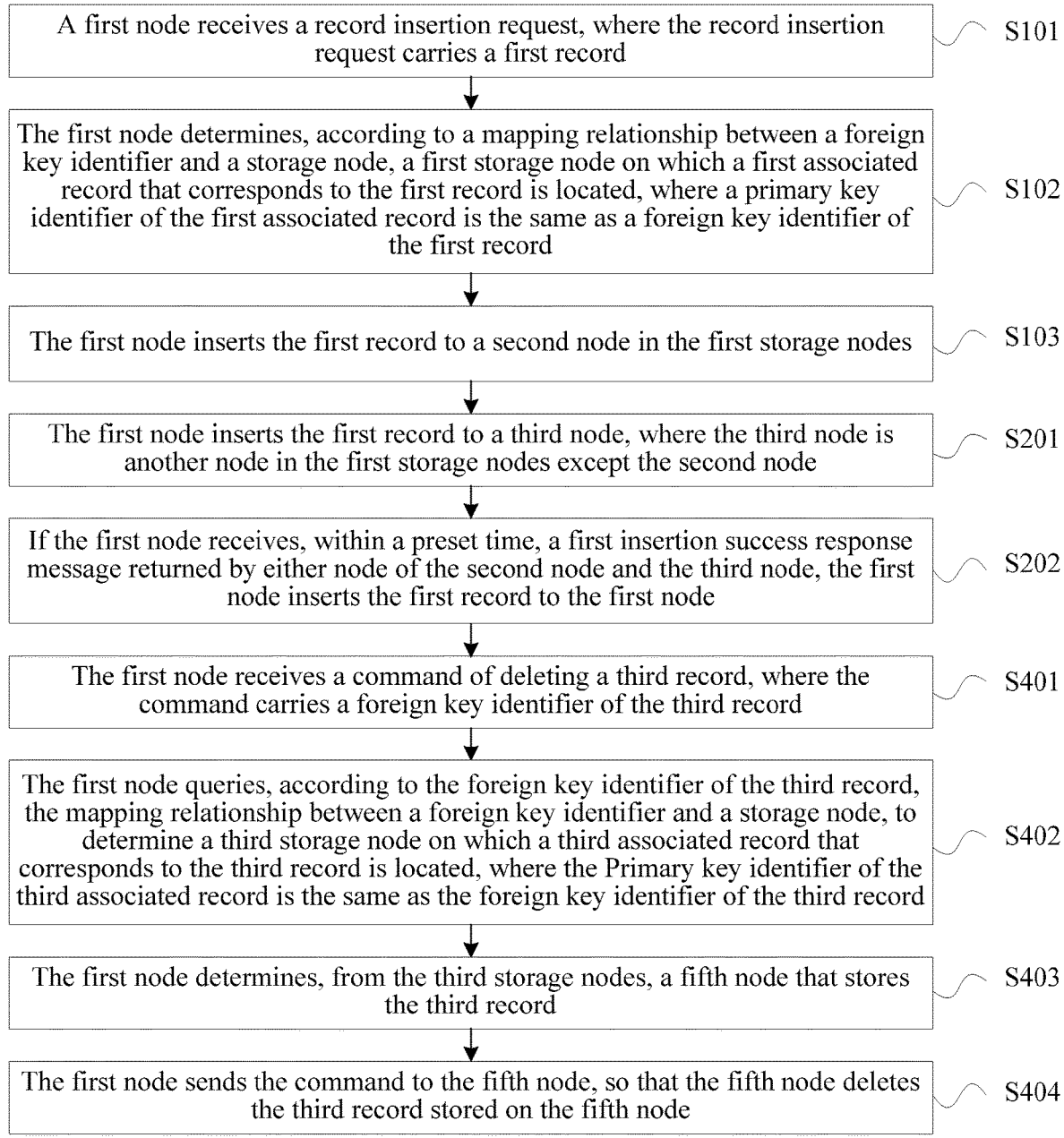
FIG. 4 is a schematic flowchart of Embodiment 4 of a data storage method for a distributed database according to the present disclosure.

FIG. 4 is a schematic flowchart of Embodiment 4 of a data storage method for a distributed database according to the present disclosure. The method involved in this embodiment is to perform a series of operations after the first node receives a record deletion command. On a basis of the foregoing embodiment, after step S202, the method for determining, according to a primary key identifier in a deletion command, a third record to be deleted, determining, according to a foreign key identifier of the third record, a foreign key copy node that stores the third record, and deleting the third record stored on the foreign key copy node further includes:

Step S401: The first node receives a command of deleting a third record, where the command carries a foreign key identifier of the third record.

Furthermore, the client sends the deletion command of deleting a record to the front-end server, and the front-end server forwards the deletion command to the first node, where the deletion command carries the foreign key identifier of the third record to be deleted. The first node determines, according to the deletion command, that a record to be deleted is the third record, and then determines the foreign key identifier of the third record. Therefore, it can be considered that the deletion command carries the foreign key identifier of the third record.

Step S402: The first node queries, according to the foreign key identifier of the third record, the mapping relationship between a foreign key identifier and a storage node, to determine a third storage node on which a third associated record that corresponds to the third record is located, where the primary key identifier of the third associated record is the same as the foreign key identifier of the third record.

Step S403: The first node determines, from the third storage nodes, a fifth node that stores the third record.

Furthermore, after determining that the record to be deleted is the third record, the first node queries the mapping relationship, between a foreign key identifier and a storage node, on the first node according to the foreign key identifier of the third record, to determine the third storage node on which the third associated record that corresponds to the third record is located, where there may be multiple third storage nodes, that is, to determine a foreign key identifier range within which the foreign key identifier of the third record is located, and third storage nodes on which records within the located foreign key identifier range are stored and backed up, so as to determine the third storage node that stores the third associated record. The first node determines the fifth node from the third storage nodes, that is, determines the foreign key copy node of the third record.

Step S404: The first node sends the command to the fifth node, so that the fifth node deletes the third record stored on the fifth node.

Figure 5:
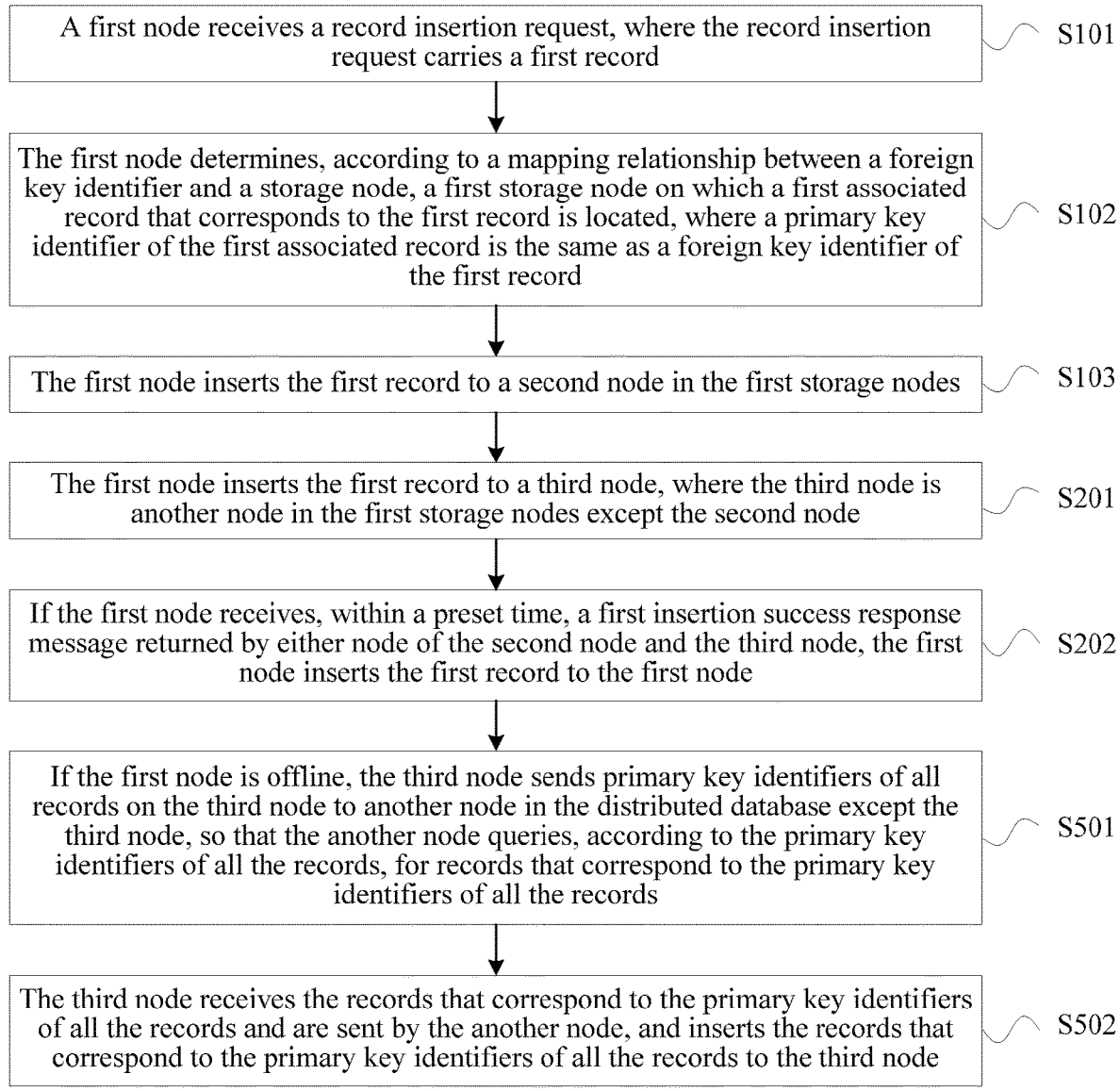
FIG. 5 is a schematic flowchart of Embodiment 5 of a data storage method for a distributed database according to the present disclosure.

FIG. 5 is a schematic flowchart of Embodiment 5 of a data storage method for a distributed database according to the present disclosure. The method involved in this embodiment is specific to a scenario of restoring a foreign key copy after the first node is offline. On a basis of the foregoing embodiment, as shown in FIG. 5, after step S202, the method includes the following steps:

Step S501: If the first node is offline, the third node sends primary key identifiers of all records on the third node to another node in the distributed database except the third node, so that the other node queries, according to the primary key identifiers of all the records, for records that correspond to the primary key identifiers of all the records.

Step S502: The third node receives the records that correspond to the primary key identifiers of all the records and are sent by the other node, and inserts the records that correspond to the primary key identifiers of all the records to the third node.

Generally, in the distributed database system, a node includes a master copy of a record stored on the node, further includes a slave copy of a record that is backed up from another node, and may further include a foreign key copy inserted when the node serves as a foreign key copy node. Using the first node (the node B) as an example, records stored on the first node include a record stored by the first node (for example, the student information records with the student number 003 and the student number 004 that are stored on the node B in the foregoing example), that is, a master copy, further include the student information records with the student number 005 and the student number 006 that are backed up from the node C (the third node), that is, slave copies, and may further include a score record of the student with the student number 003 or the student number 004, that is, a foreign key copy, where the record stored by the first node is the master copy, and a record, which is stored by the first node, on the third node is the slave copy. However, during initial backup, the third node backs up only the student information records that are stored on the first node (the student information records with the student number 003 and the student number 004 that are stored on the node B), used as the slave copies of the student information records that are stored on the first node, but the third node does not back up the foreign key copy on the first node. It should be noted that, a correspondence between a node and a primary key identifier range, and backups of a master copy between nodes and a slave copy between the nodes are shown in Table 1, where there are multiple primary key identifiers in the primary key identifier range.

TABLE 1

|  | Primary key identifier range 1 | Primary key identifier range 2 | Primary key identifier range 3 |
| --- | --- | --- | --- |
| First node | Master copy | Slave copy | Slave copy |
| Second node | Slave copy | Master copy | Slave copy |
| Third node | Slave copy | Slave copy | Master copy |

It can be known from Table 1 that, in the primary key identifier range 1 (equivalent to a student number range of student information records in the foregoing example), the first node has the master copy stored by the first node, and the master copy on the first node is also backed up on the second node and the third node as the slave copy, and the first node further stores the foreign key copy inserted when the first node serves as a foreign key copy node, but slave copies backed up by the second node and the third node only have a record in the master copy stored by the first node, and does not have the foreign key copy on the first node.

When the first node is offline, the slave copy backed up by the third node from the first node is switched to a master copy, as shown in Table 2:

TABLE 2

|  | Primary key identifier range 1 | Primary key identifier range 2 | Primary key identifier range 3 |
| --- | --- | --- | --- |
| Second node | Slave copy | Master copy | Slave copy |
| Third node | Master copy 1 | Slave copy | Master copy |

As shown in Table 2, within the primary key identifier range 1, the slave copy previously backed up by the third node from the first node is switched to the master copy 1, so that the third node has its own master copy, and further has a master copy 1 after the switching is performed, where the master copy 1 after the switching is performed includes a list of primary keys within a primary key identifier range (with the student numbers 003 to 004) lacking in a foreign key copy. Further, a record of the third node (the student information records with the student numbers 005 to 006) is stored on the third node herein. The third node sends primary key identifiers of all records stored on the third node to another node in the distributed database except the third node, so that the other node queries, according to the primary key identifiers of all the records, records that correspond to these primary key identifiers. Herein, the records that correspond to the primary key identifier actually refer to records that correspond to the primary key identifier range lacking in the foreign key copy, that is, foreign key copies that the third node lacks.

After finding the records that correspond to the primary key identifier range lacking in the foreign key copy, the other node in the distributed database except the third node sends these records to the third node, and the third node receives the records that correspond to the primary key identifiers and are found by the other node, and inserts the records that correspond to the primary key identifiers to the third node.

According to the method provided in this embodiment of the present disclosure, when a first node is offline, a third node switches, to a master copy, a slave copy that is backed up from the first node, and sends information about primary key identifiers of all records stored on the third node to all other nodes in a distributed database than the third node, so that all the other nodes query, according to the primary key identifiers, records that correspond to the primary key identifiers, and send these records to the third node to save these records, to complete a recovery of a foreign key copy, thereby ensuring that when an exception that a node is offline occurs, a database can still externally provide a service.

Figure 6:
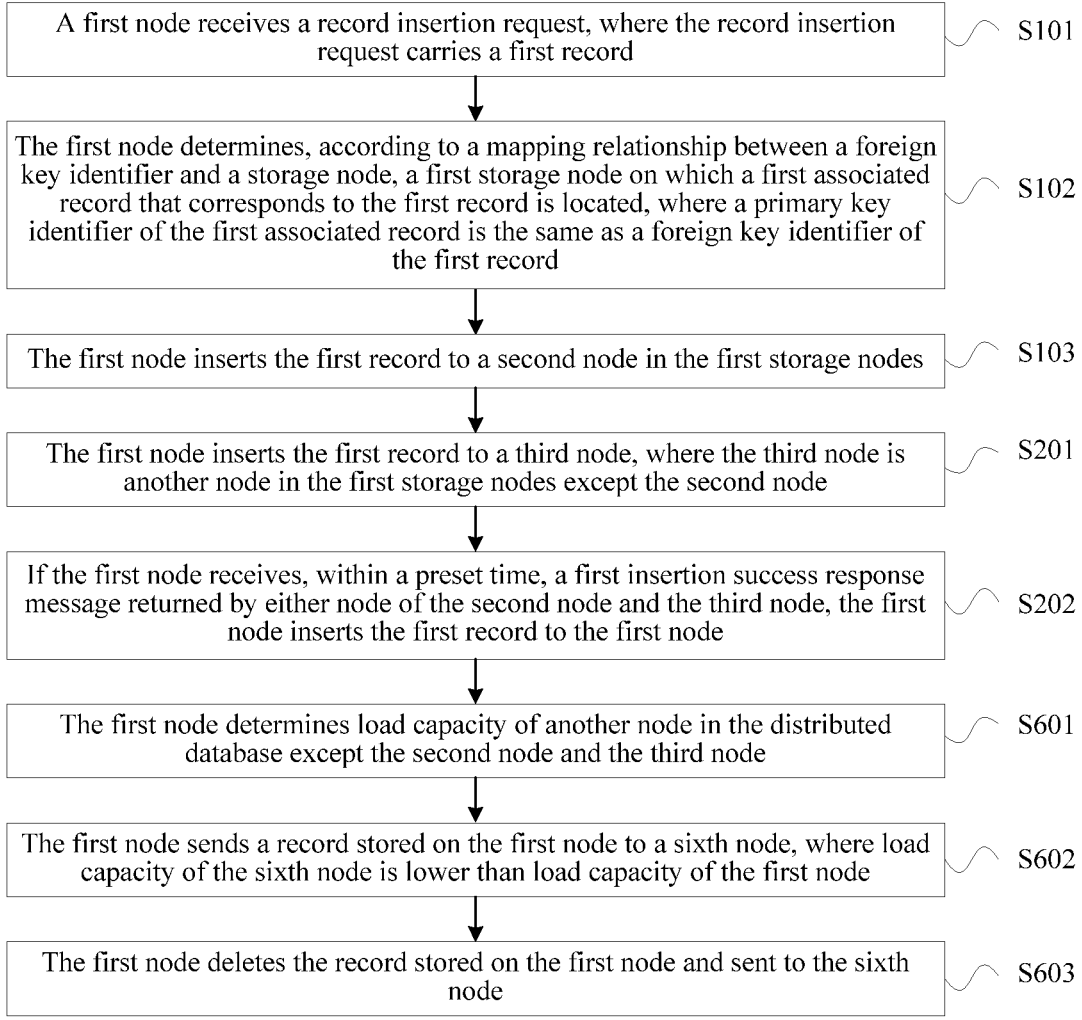
FIG. 6 is a schematic flowchart of Embodiment 6 of a data storage method for a distributed database according to the present disclosure.

FIG. 6 is a schematic flowchart of Embodiment 6 of a data storage method for a distributed database according to the present disclosure. The method involved in this embodiment is specific to a scenario in which in a distributed database system, because of unbalanced data storage, load between different nodes varies, and to balance the load, some records of a node with large load needs to be transferred to a node with small load. On a basis of the foregoing embodiment, as shown in FIG. 6, after step S202, the method further includes the following steps.

Step S601: The first node determines load capacity of another node in the distributed database except the second node and the third node.

Step S602: The first node sends a record stored on the first node to a sixth node, where load capacity of the sixth node is lower than load capacity of the first node.

Step S603: The first node deletes the record stored on the first node and sent to the sixth node.

Furthermore, after determining the load capacity of the other node in the distributed database except the second node and the third node, the first node determines, according to a load capacity determining mechanism of the first node, any node with load capacity lower than that of the first node, and sends some records on the first node to the determined node with the load capacity lower than that of the first node. Then, the first node deletes the some records on the first node.

According to the method provided in this embodiment, a first node determines any node, with load capacity lower than that of the first node, in a distributed database except a second node and a third node, and sends some records on the first node to the determined node, to reduce load of the first node, thereby balancing load of each node in the distributed database.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read only memory (ROM), a random access memory (RAM), a magnetic disk, or an optical disc.

Figure 7:
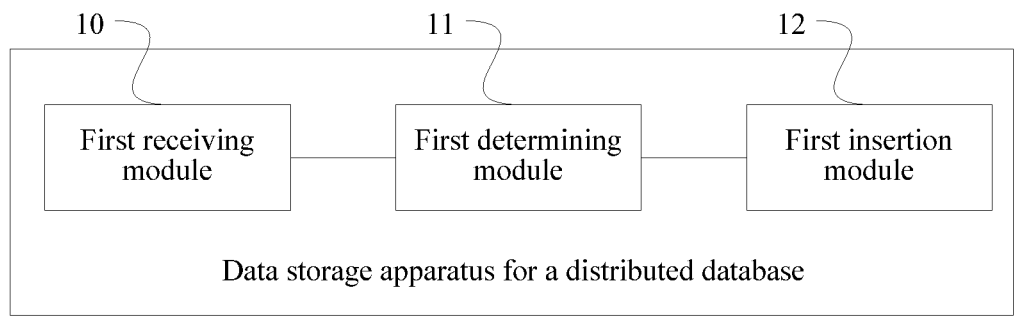
FIG. 7 is a schematic structural diagram of Embodiment 1 of a data storage apparatus for a distributed database according to the present disclosure.
Figure 8:
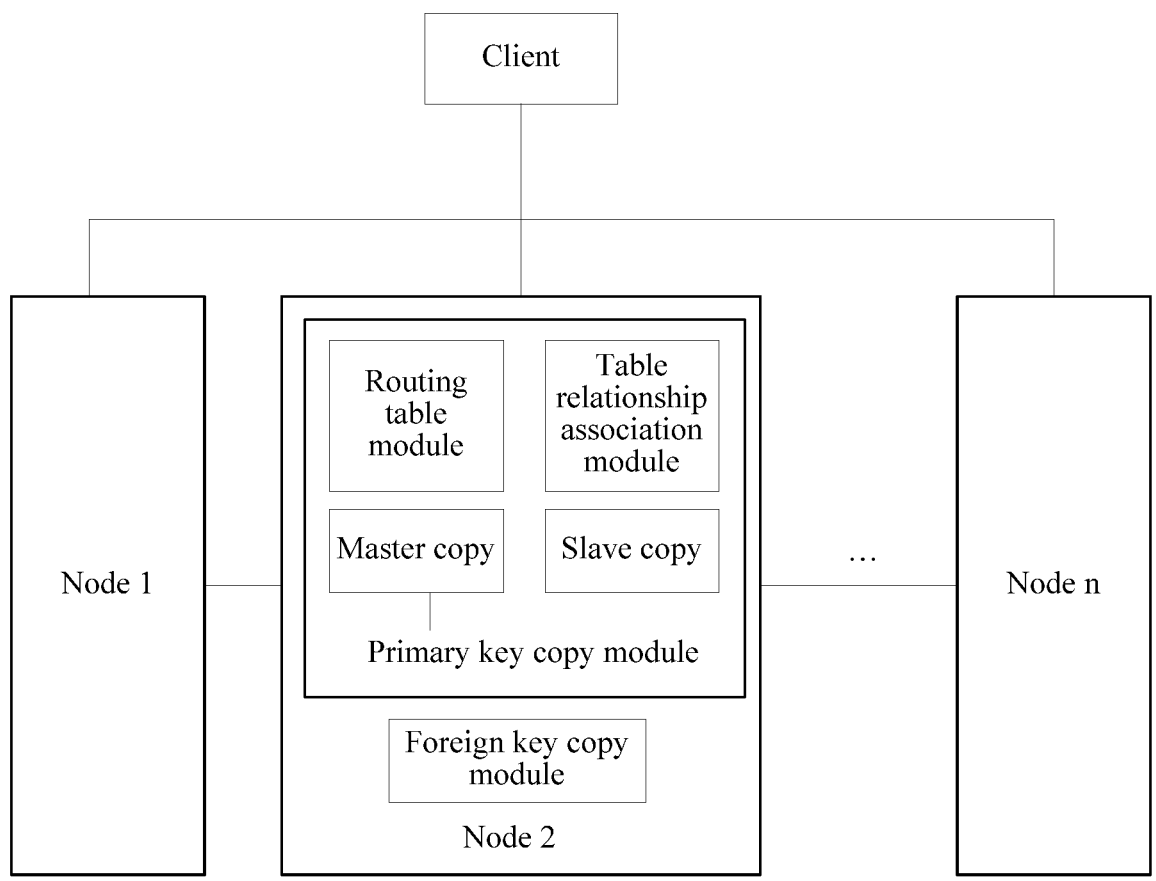
FIG. 8 is a schematic diagram of an application of the data storage apparatus for a distributed database according to the present disclosure.

FIG. 7 is a schematic structural diagram of Embodiment 1 of a data storage apparatus for a distributed database according to the present disclosure, and FIG. 8 is a schematic diagram of an application of the data storage apparatus for a distributed database according to the present disclosure. As shown in FIG. 7, the apparatus includes a first receiving module 10 configured to receive a record insertion request, where the record insertion request carries a first record; a first determining module 11 configured to determine, according to a mapping relationship between a foreign key identifier and a storage node, a first storage node on which a first associated record that corresponds to the first record is located, where a primary key identifier of the first associated record is the same as a foreign key identifier of the first record, and a first insertion module 12 configured to insert the first record to a second node in the first storage nodes.

It should be noted that, a node 1 to a node n in FIG. 8 may all refer to the first node in this embodiment of the present disclosure. Herein, using that a node 2 in FIG. 8 is the first node as an example, the mapping relationship, between a foreign key identifier and a storage node, on the first node may be stored in a routing table module shown in FIG. 8, the first determining module 11 may be disposed in a table relationship association module, and the first record that the first node inserts to the second node is actually a generated foreign key copy of the first node. Therefore, the foreign key copy may be stored in the foreign key copy module.

The data storage apparatus for a distributed database provided in this embodiment can perform the foregoing method embodiment shown in FIG. 1, and implementation principles and technical effects of the data storage apparatus for a distributed database and the method embodiment are similar, which are not described in detail herein again.

Figure 9:
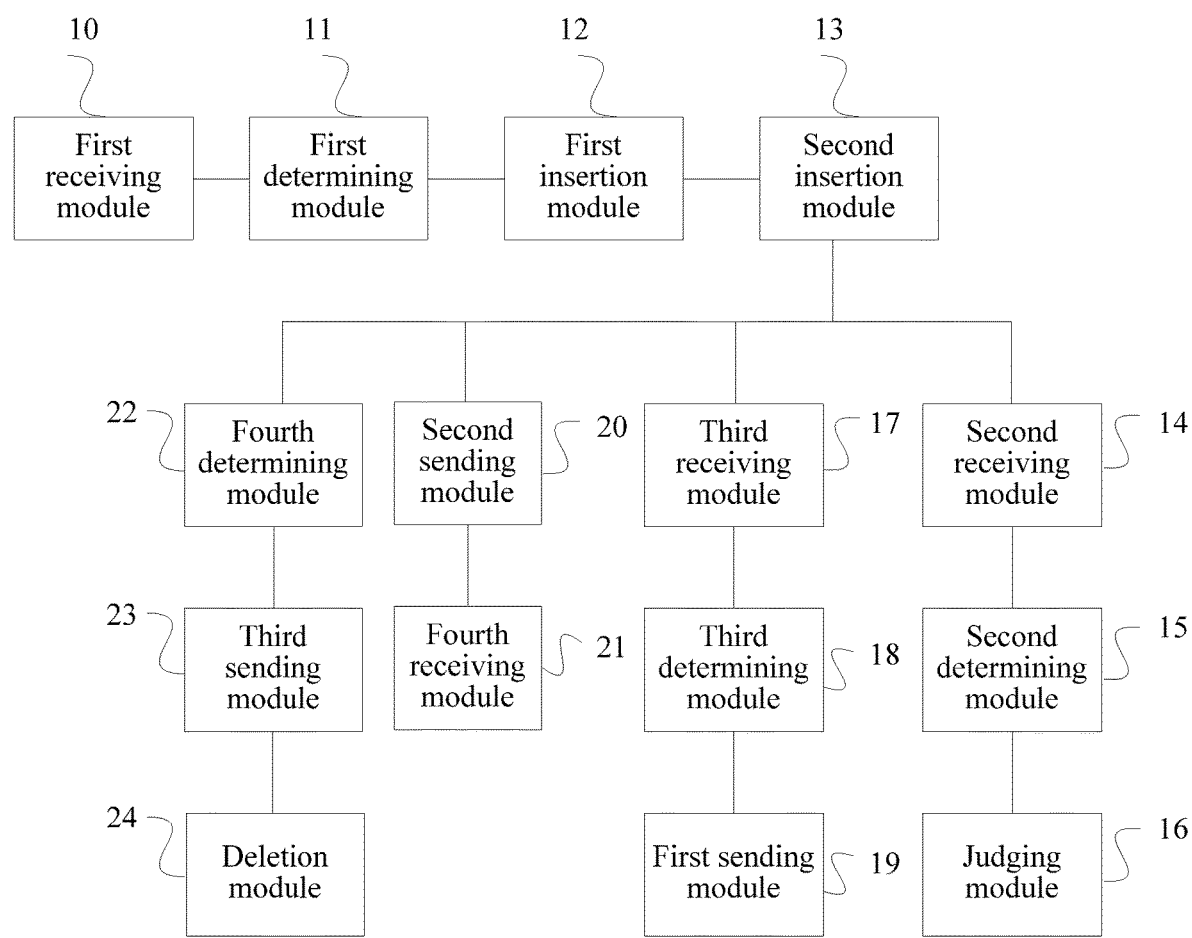
FIG. 9 is a schematic structural diagram of Embodiment 2 of a data storage apparatus for a distributed database according to the present disclosure.

FIG. 9 is a schematic structural diagram of Embodiment 2 of a data storage apparatus for a distributed database according to the present disclosure. On a basis of the foregoing embodiment shown in FIG. 7, as shown in FIG. 9, the first determining module 11 is further configured to query the mapping relationship between a foreign key identifier and a storage node according to the foreign key identifier of the first record, to determine the first storage node on which the first associated record that corresponds to the first record is located, and the first insertion module 12 is further configured to, after inserting the first record to the second node in the first storage nodes, insert the first record to a third node, where the third node is a node in the first storage nodes except the second node. The first storage nodes include a master storage node and a backup storage node that store the first associated record. The apparatus further includes a second insertion module 13 configured to, after the first insertion module 12 inserts the first record to the second node in the first storage nodes, if a first insertion success response message returned by either node of the second node and the third node is received within a preset time, insert the first record to a first node of the data storage apparatus for a distributed database.

The data storage apparatus for a distributed database provided in this embodiment can perform the foregoing method embodiment shown in FIG. 2, and implementation principles and technical effects of the data storage apparatus for a distributed database and the method embodiment are similar, which are not described in detail herein again.

Continuing to refer to FIG. 9, further, the apparatus further includes a second receiving module 14 configured to, after the second insertion module 13 inserts the first record to the first node, receive an update command, where the update command carries a second record, where the first determining module 11 is further configured to query the mapping relationship between a foreign key identifier and a storage node according to a foreign key identifier of the second record, to determine a second storage node on which a second associated record that corresponds to the second record is located, where a primary key identifier of the second associated record is the same as the foreign key identifier of the second record, a second determining module 15 configured to determine a fourth node from the second storage nodes, and a judging module 16 configured to, after the second determining module 15 determines the fourth node, if the foreign key identifier of the second record is different from the foreign key identifier of the first record, determine whether the fourth node and the second node are a same node, where if the fourth node and the second node are a same node, the second insertion module 13 inserts the second record to the first node of the data storage apparatus for a distributed database, the third node, and the second node, or if the fourth node and the second node are not a same node, the second insertion module 13 deletes the first record from the second node, and inserts the second record to the fourth node to which the second record belongs, or if the foreign key identifier of the second record is the same as the foreign key identifier of the first record, the second insertion module 13 inserts the second record to the first node of the data storage apparatus for a distributed database, the third node, and the second node.

The data storage apparatus for a distributed database provided in this embodiment can perform the foregoing method embodiment shown in FIG. 3, and implementation principles and technical effects of the data storage apparatus for a distributed database and the method embodiment are similar, which are not described in detail herein again.

Continuing to refer to FIG. 9, the apparatus further includes a third receiving module 17 configured to, after the second insertion module 13 inserts the first record to the first node, receive a command of deleting a third record, where the command carries a foreign key identifier of the third record, a third determining module 18 configured to query the mapping relationship between a foreign key identifier and a storage node according to the foreign key identifier of the third record, to determine a third storage node on which a third associated record that corresponds to the third record is located, and further configured to determine, from the third storage nodes, a fifth node that stores the third record, and a first sending module 19 configured to send the command to the fifth node, so that the fifth node deletes the third record stored on the fifth node.

The data storage apparatus for a distributed database provided in this embodiment can perform the foregoing method embodiment shown in FIG. 4, and implementation principles and technical effects of the data storage apparatus for a distributed database and the method embodiment are similar, which are not described in detail herein again.

Continuing to refer to FIG. 9, the apparatus further includes a second sending module 20 configured to, after the second insertion module 13 inserts the first record to the first node of the data storage apparatus for a distributed database, if the first node of the data storage apparatus for a distributed database is offline, send, by the second sending module 20, primary key identifiers of all records on the third node to another node in the distributed database except the third node, so that the other node queries, according to the primary key identifiers of all the records, records that correspond to the primary key identifiers of all the records, and a fourth receiving module 21 configured to receive the records that correspond to the primary key identifiers of all the records and are sent by all other nodes, and insert the records that correspond to the primary key identifiers of all the records to the third node.

The data storage apparatus for a distributed database provided in this embodiment can perform the foregoing method embodiment shown in FIG. 5, and implementation principles and technical effects of the data storage apparatus for a distributed database and the method embodiment are similar, which are not described in detail herein again.

Continuing to refer to FIG. 9, the apparatus further includes a fourth determining module 22 configured to after the second insertion module 13 inserts the first record to the first node of the data storage apparatus for a distributed database, determine load capacity of another node in the distributed database except the second node and the third node, a third sending module 23 configured to send a record stored on the first node of the data storage apparatus for a distributed database to a sixth node, where load capacity of the sixth node is lower than load capacity of the first node, and a deletion module 24 configured to delete the record stored on the first node of the data storage apparatus for a distributed database and sent to the sixth node.

The data storage apparatus for a distributed database provided in this embodiment can perform the foregoing method embodiment shown in FIG. 5, and implementation principles and technical effects of the data storage apparatus for a distributed database and the method embodiment are similar, which are not described in detail herein again.

Finally, it should be noted that the foregoing embodiments are merely intended for describing the technical solutions of the present disclosure, rather than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solution to depart from the scope of the technical solutions of the embodiments of the present disclosure.

What is claimed is:

1. A data storage method for a distributed database implemented by a first node, the data storage method comprising:
    receiving a record insertion request, wherein the record insertion request carries a first record;
    determining, according to a mapping relationship between a foreign key identifier and a storage node, one or more first storage nodes on which a first associated record that corresponds to the first record is located, wherein a primary key identifier of the first associated record is the same as a foreign key identifier of the first record and uniquely represents the first record in a data table:
    inserting the first record to a second node in the first storage nodes;
    inserting the first record to a third node, wherein the third node is a node that is in the first storage nodes and that is not the second node
    receiving a response message from the second node or the third node and within a preset time, wherein the response message indicates that the first record is successfully inserted;
    inserting, in response to receiving the response message within the preset time, the first record to the first node;
    receiving an update command, wherein the update command carries a second record;
    querying the mapping relationship between the foreign key identifier and the storage node according to a foreign key identifier of the second record;
    determining one or more second storage nodes on which a second associated record that corresponds to the second record is located, wherein a primary key identifier of the second associated record is the same as the foreign key identifier of the second record; and
    determining a fourth node from the second storage nodes.

2. The method of claim 1, wherein determining the one or more first storage nodes comprises querying the mapping relationship between the foreign key identifier and the storage node according to the foreign key identifier of the first record.

3. The method of claim 2, wherein determining the one or more first storage nodes further comprises determining the first storage nodes on which the first associated record that corresponds to the first record is located.

4. The method of claim 1, wherein the first storage nodes comprise a master storage node and a backup storage node that store the first associated record.

5. The method of claim 1, further comprising:
determining whether the fourth node and the second node are a same node when the foreign key identifier of the second record is different from the foreign key identifier of the first record;
inserting the second record to the first node, the third node, and the second node when the fourth node and the second node are the same node, and
deleting the first record from the second node.

6. The method of claim 5, further comprising inserting the second record to the fourth node when the fourth node and the second node are not the same node.

7. The method of claim 6, further comprising inserting the second record to the first node, the third node, and the second node when the foreign key identifier of the second record is the same as the foreign key identifier of the first record.

8. The method of claim 1, further comprising:
receiving a command of deleting a third record, wherein the command of deleting carries a foreign key identifier of the third record;
querying the mapping relationship between the foreign key identifier and the storage node according to the foreign key identifier of the third record;
determining one or more third storage nodes on which a third associated record that corresponds to the third record is located, wherein a primary key identifier of the third associated record is the same as the foreign key identifier of the third record;
determining from the third storage nodes, a fifth node that stores the third record; and
sending the command of deleting to the fifth node for deleting the third record stored on the fifth node.

9. The method of claim 1, further comprising:
sending, by the third node, primary key identifiers of all records on the third node to another node in the distributed database except the third node to obtain records that correspond to the primary key identifiers of all the records when the first node is offline;
receiving, by the third node, the records that correspond to the primary key identifiers of all the records and are from the other node; and
inserting, by the third node, the records that correspond to the primary key identifiers of all the records to the third node.

10. A data storage method for a distributed database implemented by a first node, the data storage method comprising:
receiving a record insertion request, wherein the record insertion request carries a first record;
determining, according to a mapping relationship between a foreign key identifier and a storage node, one or more first storage nodes on which a first associated record that corresponds to the first record is located, wherein a primary key identifier of the first associated record is the same as a foreign key identifier of the first record;
inserting the first record to a second node in the first storage nodes;
inserting the first record to a third node, wherein the third node is a node that is in the first storage nodes and that is not the second node;
receiving a response message from the second node or the third node and within a preset time, wherein the response message indicates that the first record is successfully inserted;
inserting, in response to receiving the response message within the preset time, the first record to the first node;
determining load capacity of nodes in the distributed database except the second node and the third node;
sending a record stored on the first node to a sixth node in the nodes, wherein load capacity of the sixth node is lower than the load capacity of the first node; and
deleting the record stored on the first node.

11. A first node in a distributed database, the first node comprising:
a memory configured to store instructions; and
a processor coupled to the memory and configured to execute the instructions, which cause the processor to be configured to:
receive a record insertion request, wherein the record insertion request carries a first record;
determine, according to a mapping relationship between a foreign key identifier and a storage node, one or more first storage nodes on which a first associated record that corresponds to the first record is located, wherein a primary key identifier of the first associated record is the same as a foreign key identifier of the first record and uniquely represents the first record in a data table;
insert the first record to a second node in the first storage nodes;
insert the first record to a third node;
receive a response message from the second node or the third node and within a preset time, wherein the response message indicates that the first record is successfully inserted:
insert, in response to receiving the response message within the present time, the first record to the first node:
determine load capacity of nodes in the distributed database except the second node and the third node when the first record is inserted to the first node;
send a record stored on the first node to a sixth node in the nodes, wherein the load capacity of the sixth node is lower than the load capacity of the first node; and
delete the record stored on the first node.

12. The first node of claim 11, wherein the instructions further cause the processor to be configured to query the mapping relationship between the foreign key identifier and the storage node according to the foreign key identifier of the first record.

13. The first node of claim 12, wherein the instructions further cause the processor to be configured to determine the first storage nodes on which the first associated record that corresponds to the first record is located.

14. The first node of claim 11, wherein the first storage nodes comprise a master storage node and a backup storage node that store the first associated record.

15. The first node of claim 11, wherein the instructions further cause the processor to be configured to:
receive an update command, wherein the update command carries a second record when the first record is inserted to the first node;

query the mapping relationship between the foreign key identifier and the storage node according to a foreign key identifier of the second record;

determine one or more second storage nodes on which a second associated record that corresponds to the second record is located, wherein a primary key identifier of the second associated record is the same as the foreign key identifier of the second record; and determine a fourth node from the second storage nodes.

16. The first node of claim 15, wherein the instructions further cause the processor to be configured to:

determine whether the fourth node and the second node are a same node when the foreign key identifier of the second record is different from the foreign key identifier of the first record;

insert the second record to the first node, the third node, and the second node when the fourth node and the second node are the same node; and delete the first record from the second node.

17. The first node of claim 16, wherein the instructions further cause the processor to be configured to insert the second record to the fourth node to which the second record belongs when the fourth node and the second node are not the same node.

18. The first node of claim 17, wherein the instructions further cause the processor to be configured to insert the second record to the first node, the third node, and the second node when the foreign key identifier of the second record is the same as the foreign key identifier of the first record.

19. The first node of claim 11, wherein instructions further cause the processor to be configured to:

receive a command of deleting a third record when the first record is inserted to the first node, wherein the command of deleting carries a foreign key identifier of the third record;

query the mapping relationship between the foreign key identifier and the storage node according to the foreign key identifier of the third record;

determine one or more third storage nodes on which a third associated record that corresponds to the third record is located, wherein a primary key identifier of the third associated record is the same as the foreign key identifier of the third record;

determine, from the third storage nodes, a fifth node that stores the third record; and send the command of deleting to the fifth node for deleting the third record stored on the fifth node.

20. The first node of claim 11, wherein the instructions further cause the processor to be further configured to:

send primary key identifiers of all records on the third node to another node in the distributed database except the third node to obtain records that correspond to the primary key identifiers of all the records when the first node is offline;

receive the records that correspond to the primary key identifiers of all the records and are from the other node; and insert the records that correspond to the primary key identifiers of all the records to the third node.

* * * * *